(12) United States Patent
Cates et al.

(10) Patent No.: US 12,535,604 B2
(45) Date of Patent: Jan. 27, 2026

(54) SINGLE LIGHT PHOTON COUNTING RADIATION DETECTOR AND DATA TRANSMISSION METHODS

(71) Applicants: THE REGENTS OF THE UNIVERSITY OF CALIFORNIA, Oakland, CA (US); National Technology & Engineering Solutions of Sandia, LLC, Albuquerque, NM (US)

(72) Inventors: Joshua W. Cates, San Francisco, CA (US); Woon-Seng Choong, Oakland, CA (US); Erik Brubaker, Oakland, CA (US)

(73) Assignees: THE REGENTS OF THE UNIVERSITY OF CALIFORNIA, Oakland, CA (US); National Technology &Engineering Solutions of Sandia, LLC, Albuquerque, NM (US)

( * ) Notice: Subject to any disclaimer, the term of this patent is extended or adjusted under 35 U.S.C. 154(b) by 204 days.

(21) Appl. No.: 18/486,026

(22) Filed: Oct. 12, 2023

(65) Prior Publication Data
US 2024/0125948 A1   Apr. 18, 2024

Related U.S. Application Data

(60) Provisional application No. 63/415,689, filed on Oct. 13, 2022.

(51) Int. Cl.
| | |
|---|---|
| G01T 1/208 | (2006.01) |
| G01T 1/20 | (2006.01) |
| G01T 1/24 | (2006.01) |

(52) U.S. Cl.
CPC .......... *G01T 1/20184* (2020.05); *G01T 1/248* (2013.01)

(58) Field of Classification Search
None
See application file for complete search history.

(56) References Cited

U.S. PATENT DOCUMENTS

| | | | |
|---|---|---|---|
| 10,027,340 B1 * | 7/2018 | Weisenberger | H03M 1/12 |
| 2013/0044248 A1 * | 2/2013 | Turner | H03F 3/45475 |
| | | | 348/E5.091 |

(Continued)

OTHER PUBLICATIONS

Masuda, Takahiko et al., "Suppression of the optical crosstalk in a multi-channel silicon photomultiplier array", Optics Express, vol. 29, No. 11, May 24, 2021, pp. 16914-16926.

(Continued)

*Primary Examiner* — Hoon K Song
(74) *Attorney, Agent, or Firm* — O'BANION & RITCHEY LLP; John P. O'Banion

(57) ABSTRACT

A single photon radiation detector is designed for a particular radiation source fluence, such that an incident radiation photon strikes a scintillator monolith, creating scintillation photons, which are amplified by appropriately sized channels of photomultipliers optically coupled to the scintillator monolith. The photomultiplier output is electronically shaped into a corresponding stream of scintillation pulses (otherwise referred to as scintillation photons) that pass through a comparator to produce a bitstream of the detected scintillation photons, which is sampled into a field programmable gate array (FPGA) acting as a giga-sample transceiver to produce time-to-digital conversions, capable of producing an output data stream of 10's-of-giga-samples per second or more. Appropriate design ensures sparsity of scintillation photon arrival, so that each photon in the bitstream corresponds to a single incident scintillation photon.

20 Claims, 9 Drawing Sheets

(56) References Cited

U.S. PATENT DOCUMENTS

| | | | |
|---|---|---|---|
| 2017/0329021 A1* | 11/2017 | Bircher | G01T 1/17 |
| 2018/0164449 A1* | 6/2018 | Li | G01T 1/248 |
| 2024/0210575 A1* | 6/2024 | Qiang | G01T 1/2008 |

OTHER PUBLICATIONS

Cates, Joshua et al., "Low power implementation of high frequency SiPM readout for Cherenkov and scintillation detectors in TOF-PET", Physics in Medicine Biology, vol. 67, 2022, pp. 1-10.

Kim, Heejong et al., "A new time calibration method for switched-capacitor-array-based waveform samplers," Nuclear Instruments and Methods in Physics Research A, vol. 767, 2014, pp. 67-74.

Ritt, Stefan "Design and Performance of the 6 GHz Waveform Digitizing Chip DRS4," 2008 IEEE Nuclear Science Symposium Conference Record, Dresden, Germany, 2008, pp. 1512-1515.

Nemallapudi, Myrtha Varun et al., "Single photon time resolution of state of the art SiPMs," JINST, vol. 11, 2016, pp. 1-19.

Gola, Alberto et al., "SiPM optical crosstalk amplification due to scintillator crystal: effects on timing performance," Physics in Medicine Biology, vol. 59, 2014, pp. 3615-3635.

Gundacker, Stefan et al., "High-frequency SiPM readout advances measured coincidence time resolution limits in TOF-PET", Physics in Medicine & Biology, vol. 64, 2019, pp. 1-9.

Krizhevsky, Alex et al., "ImageNet Classification with Deep Convolutional Neural Networks", Proc. Adv. Neural Inf. Proc. Syst., 2012, pp. 1097-1105.

Barton, Paul, et al., "Effect of SSPM Surface Coating on Light Collection Efficiency and Optical Crosstalk for Scintillation Detection", https://escholarship.org/uc/item/66c5d9pj, Oct. 21, 2009, pp. 1-7.

Borghi, Giacomo, et al., "Sub-3 mm, near-200 ps TOF/DOI-PET imaging with monolithic scintillator detectors in a 70 cm diameter tomographic setup", Phys. Med. Biol. 63 (2018) 155006 (13pp), Jul. 27, 2018.

Cates, Joshua W., et al., "Evaluation of a clinical TOF-PET detector design that achieves ≤ 100 ps coincidence time resolution", Phys Med Biol.; 63(11): 115011. doi: 10.1088/1361-6560/aac504, Jun. 25, 2018, pp. 1-30.

Gundacker, Stefan, et al., "Experimental time resolution limits of modern SiPMs and TOF-PET detectors exploring different scintillators and Cherenkov emission", 2020 Phys. Med. Biol. 65 025001 (20 pp), Jan. 16, 2020.

Krizhevsky, Alex, et al., "ImageNet Classification with Deep Convolutional Neural Networks", Communications of the ACM, vol. 60, Issue 6, Jun. 2017, pp. 84-90, https://doi.org/10.1145/3065386, May 24, 2017.

Liu, Z., et al., "In-depth study of single photon time resolution for the Phillips digital silicon photomultiplier", JINST 11 P06006, Jun. 9, 2016, pp. 1-14.

\* cited by examiner

SINGLE LIGHT PHOTON COUNTING RADIATION DETECTOR AND DATA TRANSMISSION METHODS

CROSS-REFERENCE TO RELATED APPLICATIONS

This application claims priority to, and the benefit of, U.S. provisional patent application Ser. No. 63/415,689 filed on Oct. 13, 2022, incorporated herein by reference in its entirety.

STATEMENT REGARDING FEDERALLY SPONSORED RESEARCH OR DEVELOPMENT

This invention was made with government support under Contract No. DE-AC02-05CH11231 awarded by the U.S. Department of Energy, Contract No. DE-NA-0003525 awarded by the U.S. Department of Energy's National Nuclear Security Administration, and Grant No. R01EB028286 awarded by the National Institutes of Health. The government has certain rights in this invention.

BACKGROUND

1. Technical Field

This disclosure relates generally to radiation detectors, and more particularly to single light photon counting radiation detectors and data transmission methods.

2. Background Discussion

Standard signal processing approaches for scintillation and optical photon detectors derive accurate estimates for radiation time of interaction and energy imparted to the detection media from aggregate characteristics of resultant electronic pulse shapes. The ultimate realization of a scintillation detector is one that provides unique timestamps and positions for detected scintillation photons. Such a detector can take advantage of coupled three-dimensional (3D) position and time of interaction of ionizing radiation, intrinsically encoded in the spatiotemporal arrival time profiles of scintillation light maps. A detector with this capability can provide improved performance over detectors that extract information on ionizing radiation from aggregate pulse shape information.

BRIEF SUMMARY

The presented technology and methods demonstrate that scintillation detectors that uniquely count scintillation photons can be realized by taking into consideration: (1) the temporal photon density of a scintillator, (2) the channel density of arrays of analog silicon photomultipliers (SiPMs), (3) low noise, high frequency electronic readout, and (4) electronic signal shaping. Moreover, the invention includes novel information digitizing and data transmission schemes with gigabit transceivers in Field Programmable Gate Arrays (FPGAs)

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

Figure 1:
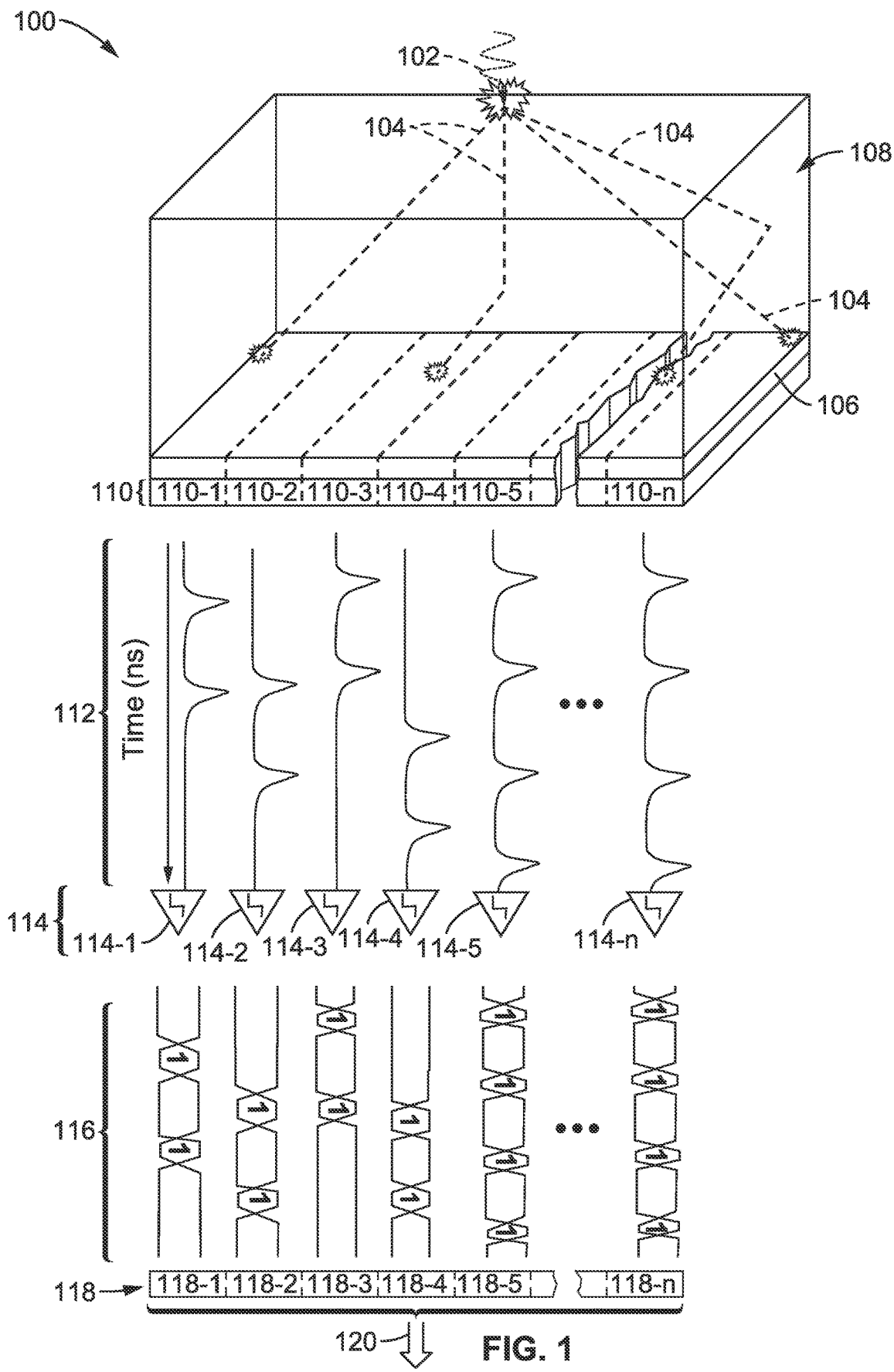
FIG. 1 is a depiction of an n-channel scintillation photon counting detector with accompanying signal digitization and transmission

Referring now to FIG. 1, which is an illustration 100 of a single photon radiation detector, with associated signal digitization and transmission methodology for an n-channel detector system. A single incident radiation photon 102 input generates one or more scintillation photons 104 that are spread out over a channel-dense, segmented photosensor array of photomultipliers 106, preferably analog Silicon Photomultipliers (SiPMs), optically coupled to a large scintillator monolith 108.

The photomultipliers 106 may be directly electrically connected to one or more front end signal shaping devices 110, such that arrival of the scintillation photons 104 results in a stream of optical photon pulses 112, each corresponding to a particular channel 110-1, 110-2, 110-3, 110-4, 110-5 . . . 110-n in the n-channel detector array 110. Each stream of optical photon pulses 112 may also be referred to as multiple parallel streams of single scintillation pulses, one for each channel.

It should be noted that the term "scintillator pulse" is common nomenclature in the field of radiation detection, and is used in describing the aggregate electronic pulse from a standard scintillation detector upon detection of an optical photon produced in the scintillator (here the large scintillator monolith 108). The term "optical photon" pulse is used here to describe the optical photon pulse 112 that arises from detection of the scintillation photon 104.

In this illustration 100 the single incident radiation photon 102 is shown generating a scintillation effect at or near the surface of the large scintillator monolith 108. However, the scintillation effect can occur anywhere within the volume of the large scintillator monolith 108. In one example, without limitation, the single incident radiation photon 102 may be a 511 keV photon.

To further simplify the description here, the FIG. 1 n-channel detector array front end signal shapers 110 is shown as a one-dimensional (1D) linear array device, although it may be readily generalized to a two-dimensional (2D) detector channel device as a 2D array of detectors with associated 2D photomultipliers 106.

Such a configuration described so far acts to disperse scintillation 104 photons apart in space and time, thereby creating temporal sparsity in their spatiotemporal arrival time profiles at the various 110-1, 110-2, 110-3, 110-4, 110-5 . . . 110-n in the n-channel front end signal shaper 110 array.

The electronics of the front end signal shaper 110 devices are paired with corresponding photomultiplier 106 channels, as required, to shape the impulse response of the particular channel 110-1, 110-2, 110-3, 110-4, 110-5 . . . 110-n in the n-channel detector array 110 to process single scintillation photon 104 detection into a corresponding tight semi-gaussian or biexponential voltage pulse, such that individual scintillation photons 104 arriving at the detector array 110 are separated in time by an amount greater than their full-width-at-half-maximum (FWHM), which thereby ensures sparsity in scintillation photon 104 arrival times.

The detector configuration described above generates an output stream of scintillator pulses 112 corresponding to each photomultiplier 106. Signal processing of the stream of scintillator pulses 112 is via direct digitization with a single threshold or differential comparator 114-1, 114-2, 114-3, 114-4, 114-5 . . . 114-n, which transduces each channel of the stream of optical photon pulses 112 into a photon counting stream of bits 116 (otherwise referred to as a "bitstream"), where each stream of bits 116 "1" value represents a detected scintillation photon 104.

These photon counting streams of bits 116 may be directly processed by gigabit transceivers 118, one per each channel 118-1, 118-2, 118-3, 118-4, 118-5 . . . 118-n, incorporated within field-programmable-gate-arrays (FPGAs), thereby providing a method to transit multichannel bitstream data into an aggregated overall detector output 120. Altogether, the detector concept illustrated as 100 provides a complete and tractable solution for directly digitizing optical photons from radiation detectors.

By temporal sparsity, it is meant that the stream of scintillation pulses 112 and corresponding photon counting bitstreams 116 have non-overlapping "1" values, indicating that each detected scintillation photon 104 104 in a particular channel 110-1, 110-2, 110-3, 110-4, 110-5 . . . 110-n is discrete, and separated from the next detectable photon in the same channel by at least the FWHM period of each successive detected scintillation photon 104. Such temporal sparsity may be achieved by increasing the channel density of the n-channel detector array 110, the areal size of the large scintillator monolith 108, or insertion of a neutral density (ND) filter (not shown here) between the radiation source to be measured and the large scintillator monolith 108, or by any or all of the foregoing.

The resultant photon counting bitstreams 116 corresponding to the photomultipliers 106 are processed by a time-to-digital converter (TDC) for each individual channel of the photomultipliers 106, with 118-1, 118-2, 118-3, 118-4, 110-8 . . . 118-n in the n-channel detector array 110. The resultant TDC bitstream data may be paired with the individual photomultiplier 106 location, so that both the scintillation photon 104 arrival times, and arrival location may be output in a continual data stream 120. The TDC information may be generated by transceivers within a field programmable gate array (FPGA).

The resultant device of FIG. 1 directly counts optical photons arriving at the photosensor array 106. Again, by appropriate selection of the large scintillator monolith 108 size, photomultiplier 106 channel density, and optional ND filter, sparsity may be assured in the arrival time of generated scintillation photons 104 at each channel, resulting in a stream of single photons for each pixel. These photon streams are processed by field programmable gate arrays (FPGAs) and digitized by gigabit transceivers. This ultimately results in the ability to directly digitize and uniquely count each individual generated scintillation photon 104.

In alternate embodiments (not shown here), an optical bandpass filter may be placed between the large scintillator monolith 108 and photomultiplier 106, to reduce or eliminate correlated noise photons signatures, which can be generated from Geiger discharges in photomultiplier 106 arrays. In still other embodiments, this filter may be implemented to enable or improve room-temperature operation.

Figure 2A:
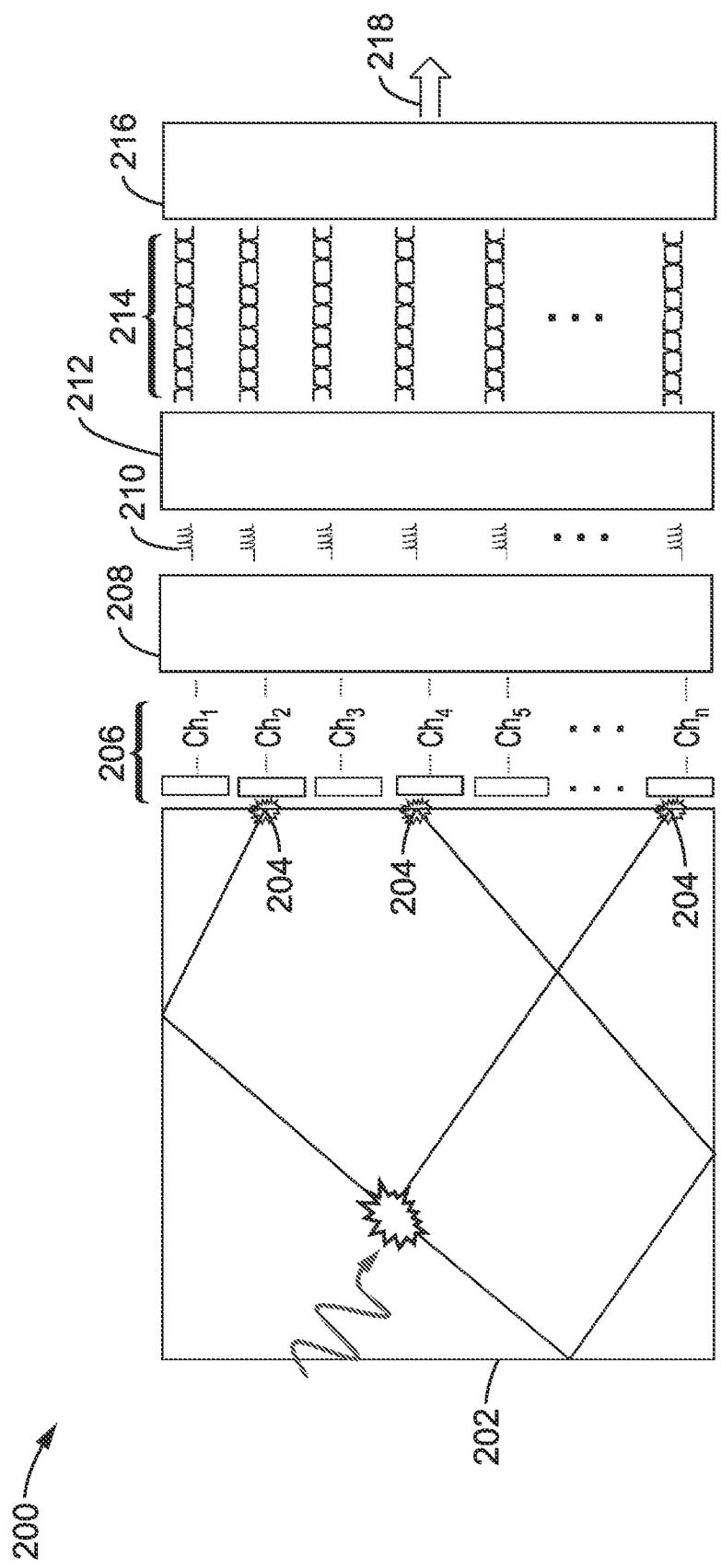
FIG. 2A is a data flow illustration for the basis of this photon counting detector technology.
Figure 2B:
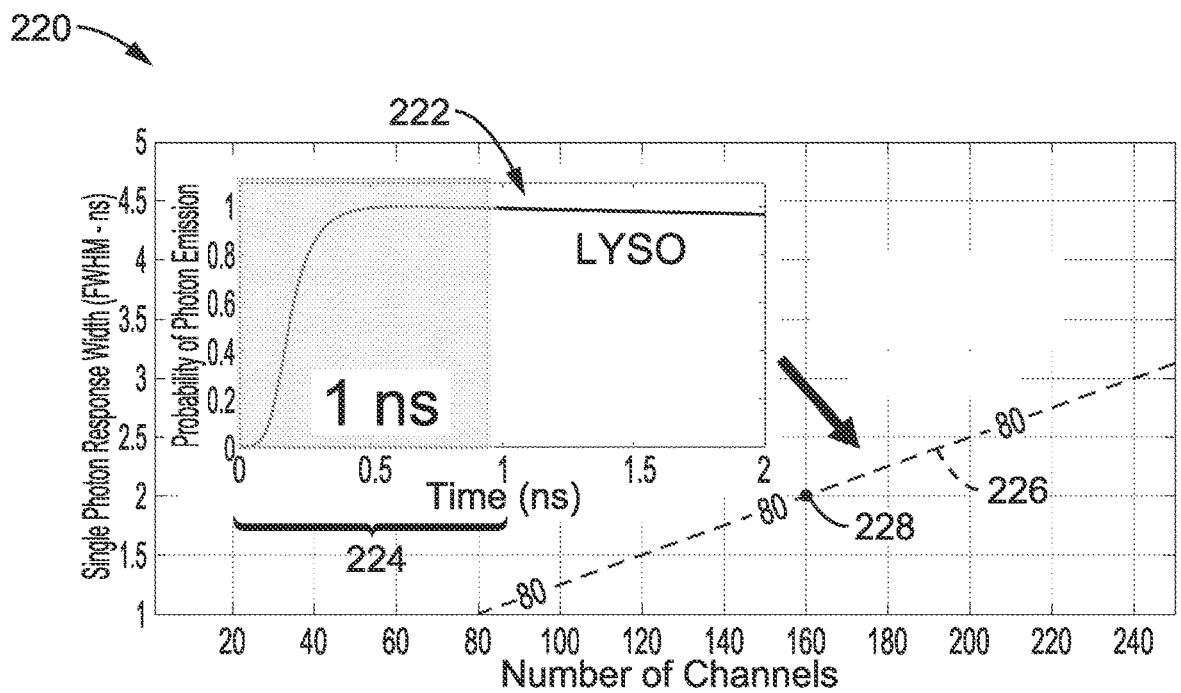
FIG. 2B is a graph of single photon FWHM width versus the number of detector channels required to uniquely count each scintillation photon produced within the first nanosecond of an example scintillation detector.
Figure 2C:
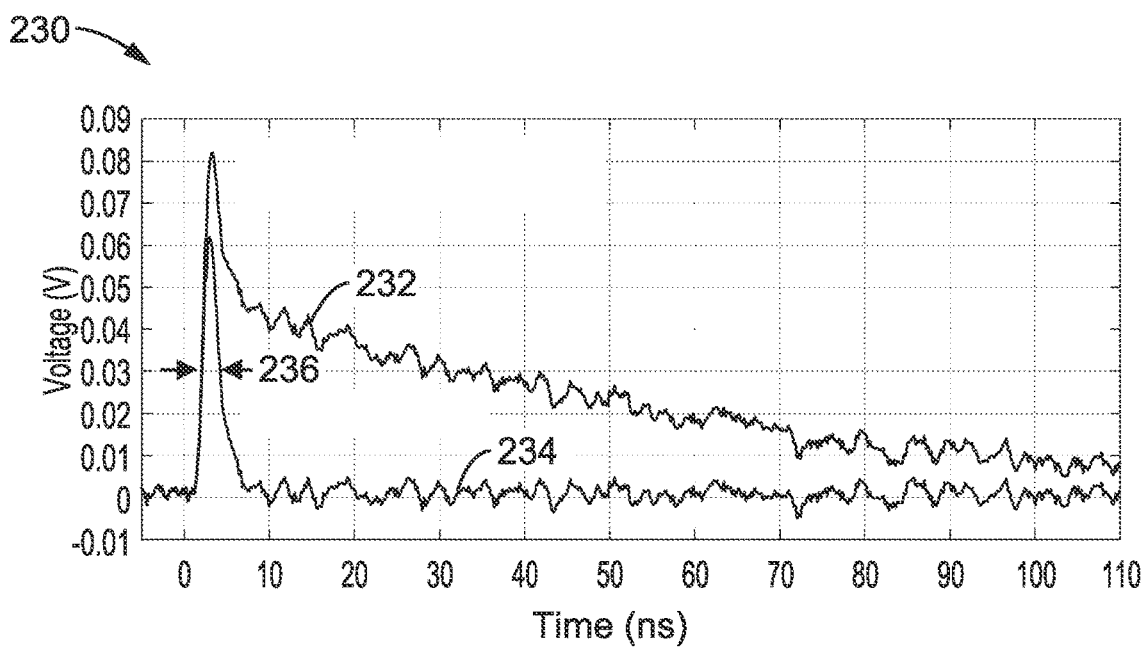
FIG. 2C is a graph of an example of the electronic signal shaping required to achieve a desired 2 ns FWHM result.

Refer now to FIG. 2A through FIG. 2C. FIG. 2A is a data flow illustration 200 for the basis of this photon counting detector technology. The detector concept directly digitizes streams of scintillation photons into streams of bits, ingesting optical photon pulses as data in gigabit transceivers. To accomplish this, optical sparsity must be achieved in the temporal arrival time profiles of scintillation photons. The method employs a large monolithic scintillator slab 202 to spread scintillation photons 204 across an array of photosensor pixels using SiPM photomultipliers 206.

As previously described above in FIG. 1, front end signal processing 208 is applied on a per-channel basis to produce a stream of scintillation photons 210, which is input into an FPGA front end 212. The FPGA front end 212 in turn outputs a photon bitstream 214 (again on a per-channel basis) that is fed to a gigabit transceiver 216 for time-to-digital converter (TDC) conversion. All of these processes are used on each channel of the detector to form an overall detector output 218 that includes data on photon detection, which may include: detector channel and converted time-to-digital photon arrival time for various scintillation photons detected during a gating period.

Achieving optical sparsity requires that light spread (scintillation crystal size), photosensor (SiPM) channel density, and electronic signal shaping (to achieve a finite impulse response for each detector photon) be appropriately configured.

Refer now to FIG. 2B, which is a graph 220 of single photon FWHM width versus the number of detector channels. This example calculation is provided for detector element selection, where a lutetium-yttrium oxyorthosilicate (LYSO) scintillator with 40,000 photons per Mega-electron Volt (MeV) luminosity, 70 picoseconds rise time, 40 nanoseconds decay time, and 40% light collection efficiency is optically coupled to a photosensor array which provides 50% optical photon detection efficiency (PDE).

As depicted in the inset graph 222 the highest density of photon emission typically occurs within the first nanosecond 224 of excitation. For this detector configuration, 80 scintillation photons are detected within the first nanosecond. Thus, the singe photon response shape FWHM and number of channels required to separate optical photons in time can be estimated, as depicted in the plot 226. For example, a detector configuration with a 2 ns wide single photon response shape would require a minimum of 160 channels of photosensor readout to achieve optical sparsity 228.

Refer now to FIG. 2C, which is an example 230 of the electronic signal shaping required to achieve desired result, where a raw single photon response shape 232 of a silicon photomultiplier (SiPM) photosensor is processed 234 with a combination of a high pass filter and pole-zero compensation to achieve a 2 ns FWHM 236.

Example Demonstration of the Photon Counting Detector Technology

Figure 3A:
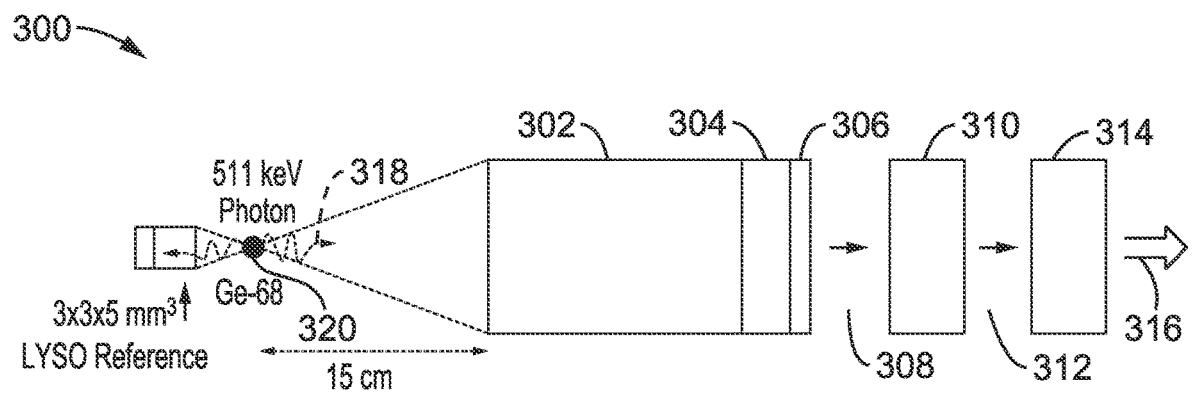
FIG. 3A is an example of a photon counting detector proof of concept experimental setup.

Refer now to FIG. 3A, FIG. 3B, FIG. 3C, FIG. 3D, FIG. 3E, and FIG. 3F, which form another example of the photon counting detector concept. In FIG. 3A, a photon counting detector proof of concept experimental setup 300 is depicted as a monolithic piece of LYSO scintillator 302 (here with 12×12×20 mm 3 dimensions) that was optically coupled to a neutral density filter 304 (which may otherwise be a bandpass filter), which reduced input photon transmission by about 90%, such that a 4×4 array of SiPMs 306 received an expected amount of scintillation light, the same as if it were one section of a 12×12 array of SiPMs. The 4×4 SiPM readout is then approximately ⅒th of the full detector module concept, comprising a 12×12 SiPM array (approximate channel density required, as calculated in FIG. 2B).

Signal processing, as previously depicted in FIG. 2C, was applied to each channel, where the SiPM 306 output signals 308 are processed by a 16 channel high frequency low noise readout 310, whose output signal 312 was digitized with a commercial digitizer 314 at 5 Giga-samples-per-second (GSa/sec) that also acts as a time to digital converter with appropriate digital output 316.

The LYSO scintillator 302 was irradiated with 511 kiloelectron Volts (keV) incident photons 318 that were emitted from a Ge-68 source 320. The prototype's electronic readout was processed in coincidence with a small reference detector, which gated the detection time of 511 keV photons in the prototype demonstrator.

Figure 3B:
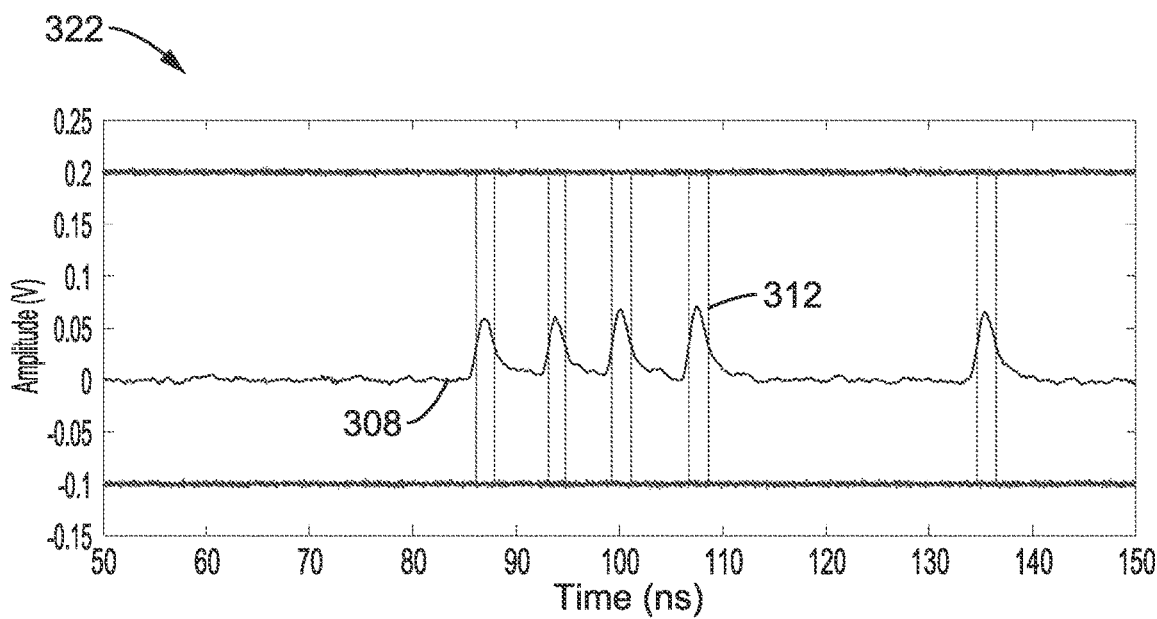
FIG. 3B is a graph of output signal amplitude versus time in example of one of the SiPM channels of FIG. 3A, also showing processing from the low-voltage differential signaling (LVDS) to digitize optical photon pulses from the SiPM channel readout.

Refer now to FIG. 3B, which is a graph 322 of output signal 308 amplitude versus time in example of one of the SiPM 306 channels, also showing the signal 312 resulting from processing by the low-voltage differential signaling (LVDS) that acts as a high frequency low noise readout 310.

Figure 3C:
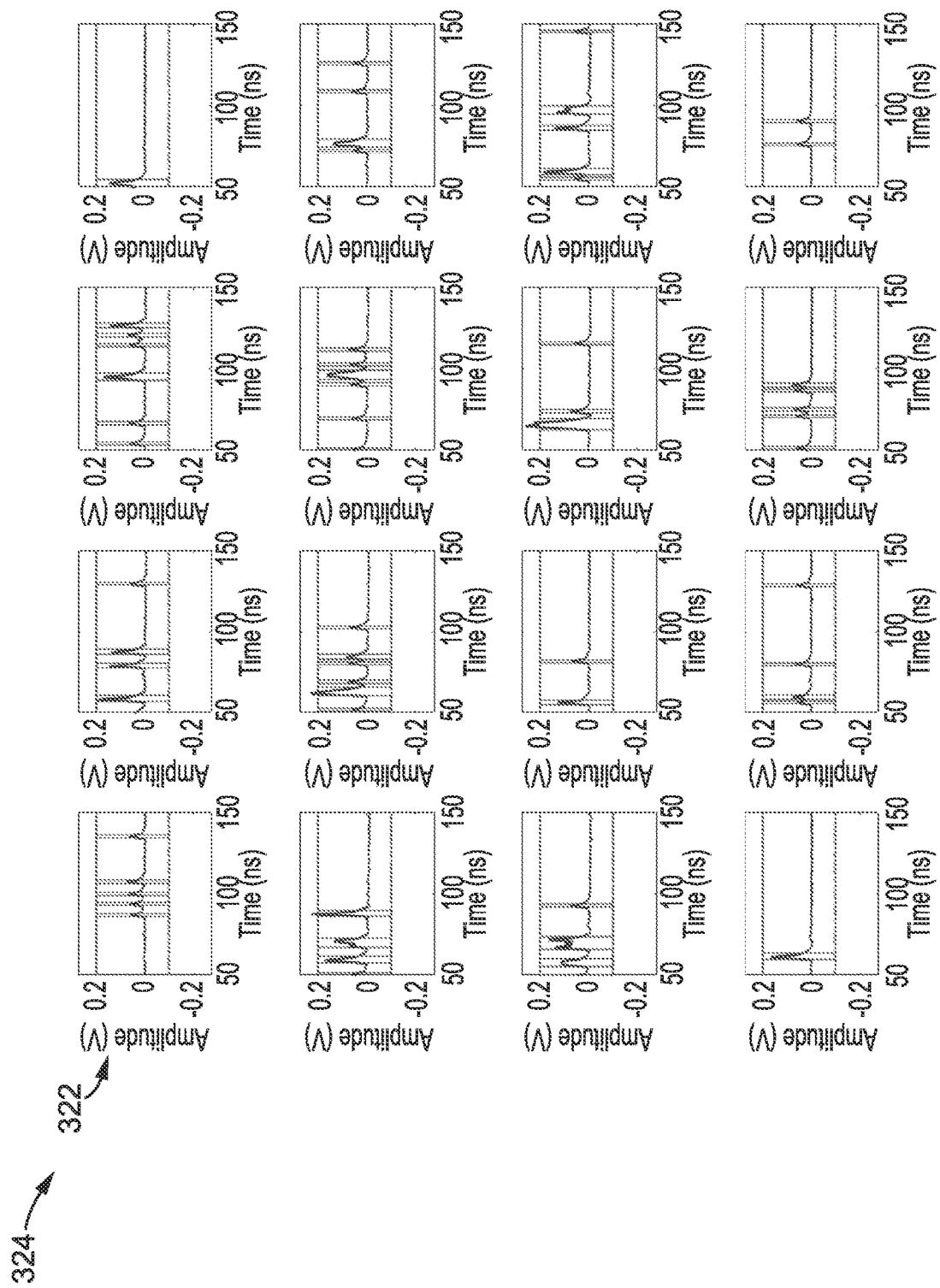
FIG. 3C is an array of graphs of output signal amplitude versus time corresponding to each of the 4×4 SiPM channels of FIG. 3A, the first of which is located in the upper left frame as a smaller version of FIG. 3B.

Refer now to FIG. 3C, which is an array of graphs 324 of output signal 308 amplitude versus time corresponding to each of the 4×4 SiPM 306 channels of FIG. 3A, the first of which is located in the upper left frame 322 as a smaller version of FIG. 3B. This array of graphs 324 shows example readouts for the sixteen SiPM 306 channels, along with simulated differential comparator applied to the recorded photon data streams. These FIG. 3C graphs show real examples of the optical photon data streams and photon counting bitstream concept.

Figure 3D:
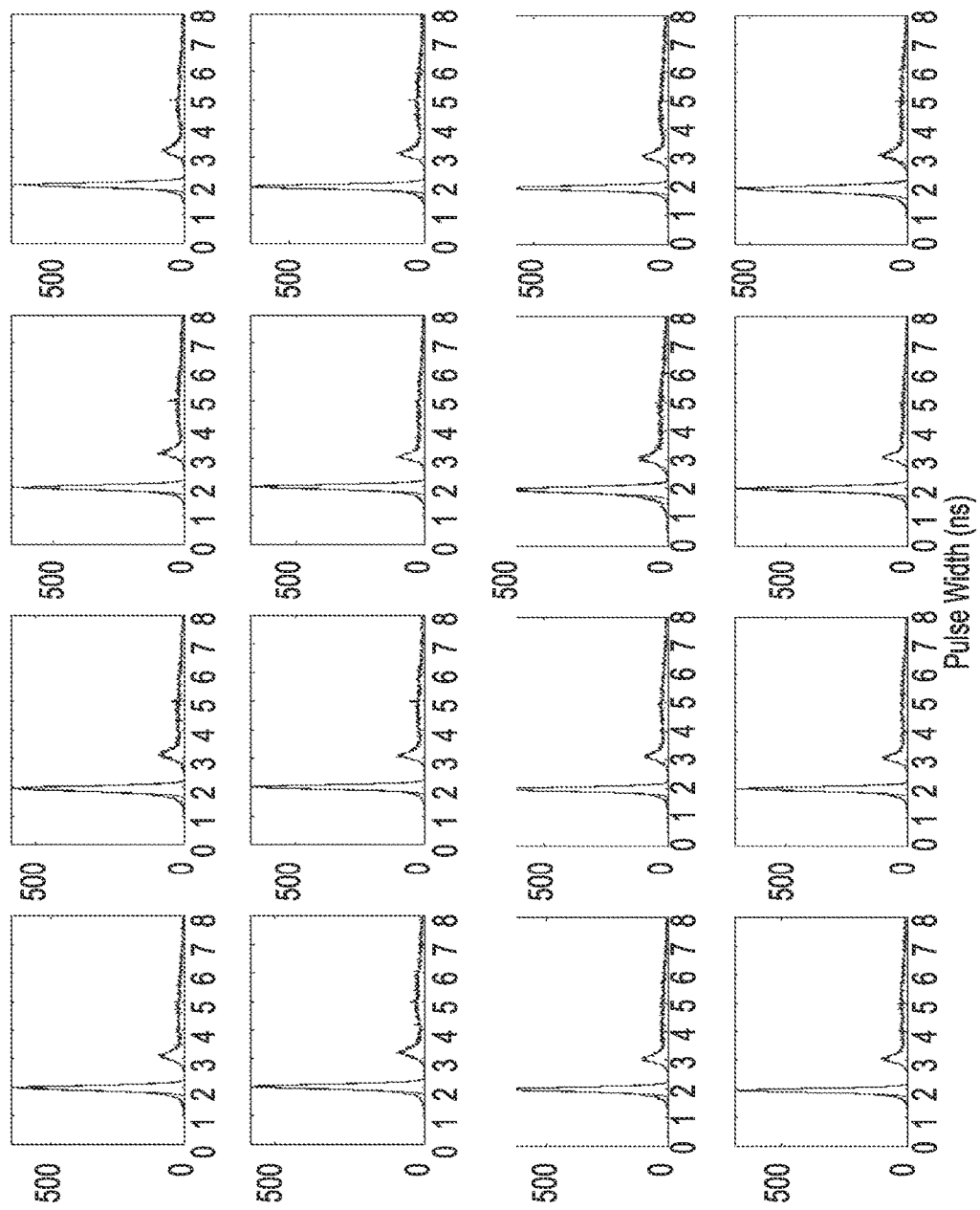
FIG. 3D is an array of graphs of cumulative pulse width distributions versus pulse width in ns of per-channel histograms of time-over-threshold values for the photon counting bitstream for one thousand 511 keV photoelectric interactions.

Refer now to FIG. 3D, which is an array of graphs of cumulative pulse width distributions versus pulse width in ns 326 of per-channel histograms of time-over-threshold values for the photon counting bitstream for one thousand 511 keV photoelectric interactions, which demonstrates the photon arrival time sparsity, where digitized photon bit streams are comprised almost entirely of one and two scintillation photon detections.

Figure 3E:
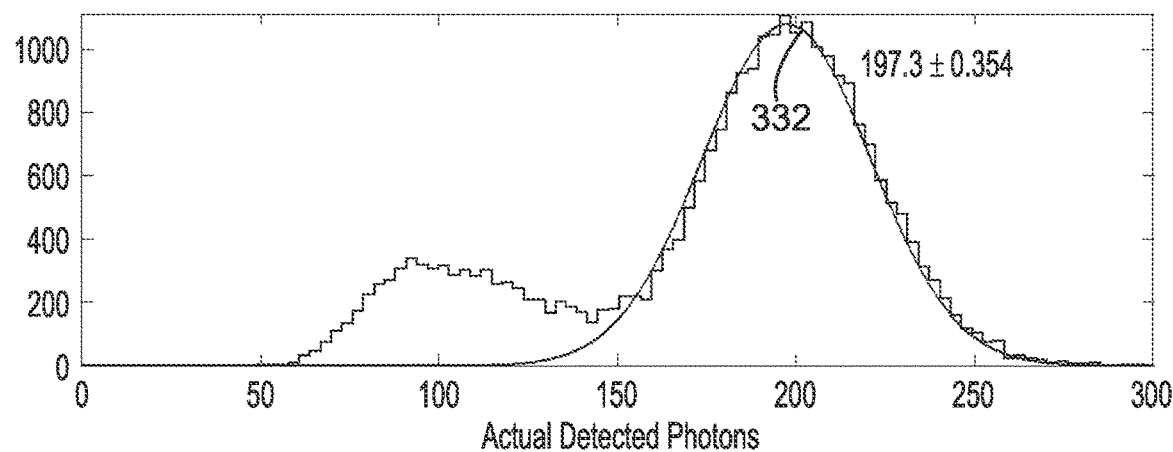
FIG. 3E shows a histogram of spectral data taken from the counted optical photons from the optical photon data stream (by simply counting the peaks).
Figure 3F:
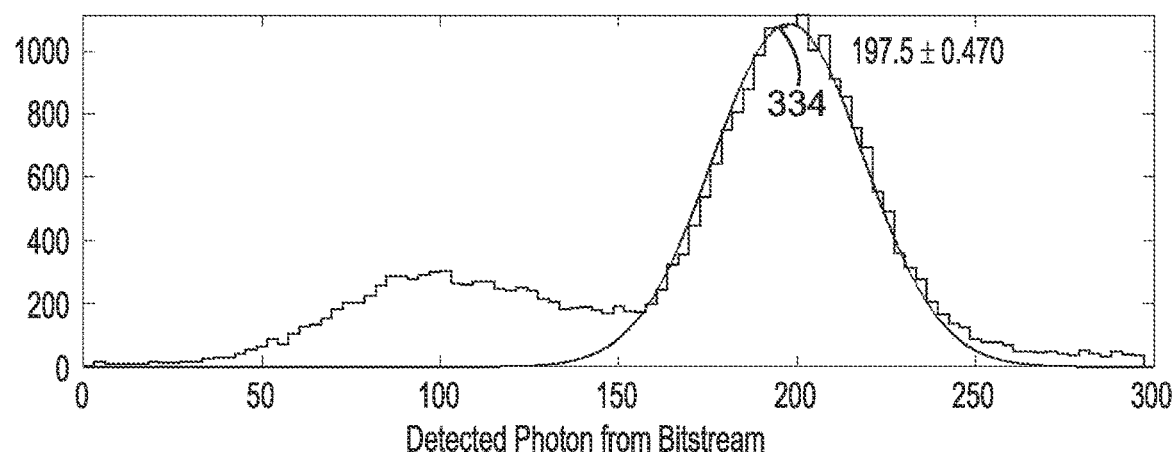
FIG. 3F shows a histogram of spectral data taken photons counted with the simulated bitstream.

Refer now to FIG. 3E and FIG. 3F, which respectively show histograms 328 of spectral data taken from the counted optical photons from the optical photon data stream (by simply counting the peaks) in FIG. 3E, and photons counted 330 with the simulated bitstream in FIG. 3F. FIG. 3E shows the true number of detected photons, which was extracted with a peak locating algorithm, and FIG. 3F shows the number of detected photons using the bit-stream concept. There is no statistical difference in the number of counted photons from ground truth optical photon data versus the simulated photon counting bitstreams with the curve fitted peak of FIG. 3E resulting in a peak 332 count of 197.3±0.354, and the curve fitted peak of FIG. 3F resulting in a peak 334 count of 197.5±0.470. Thus, this example demonstrates a confirmation of the photon counting bitstream detector concept.

Figure 4A:
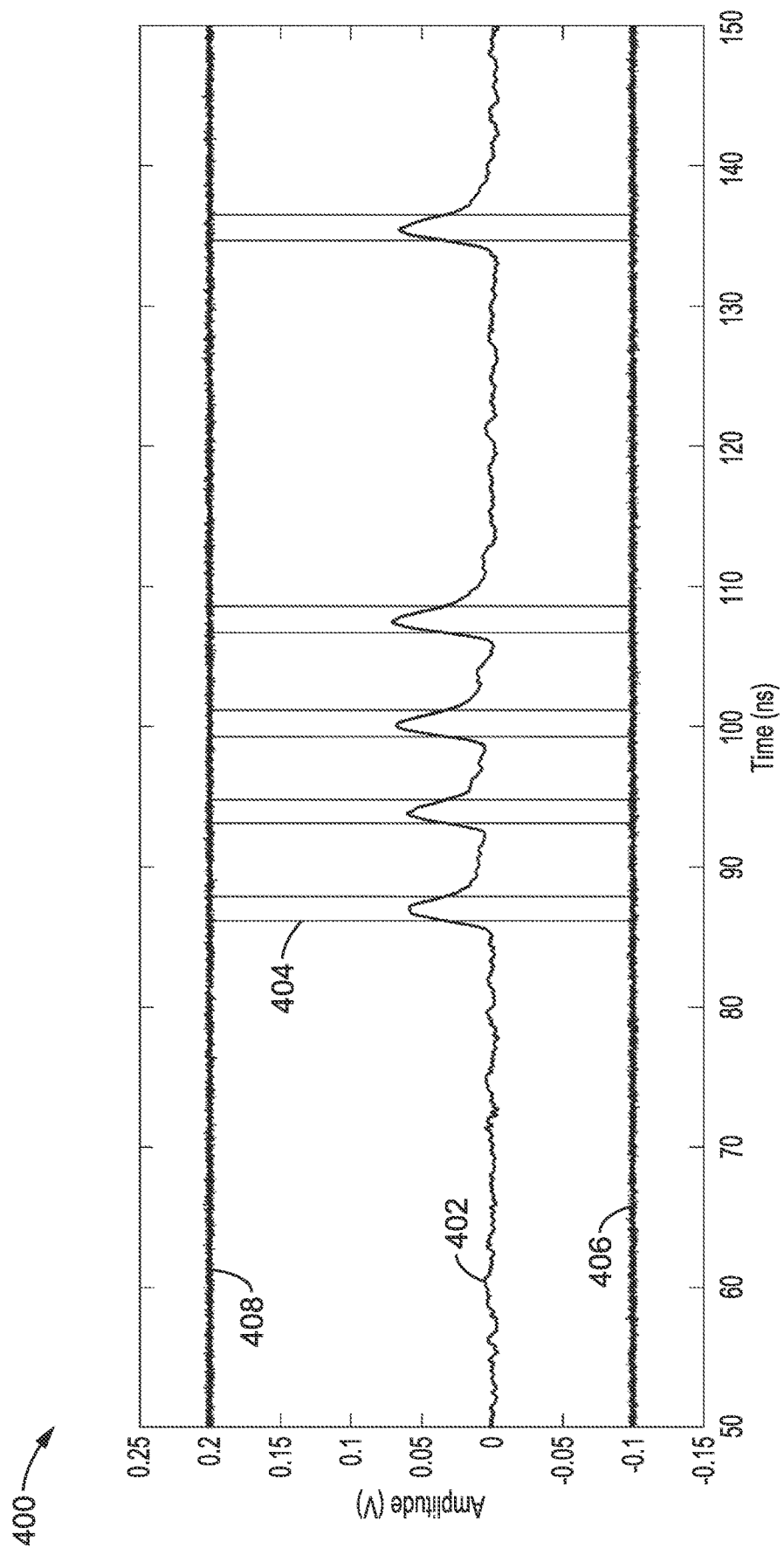
FIG. 4A is a graph that highlights another unique aspect of the methods for direct digitization and transmission of optical photon data streams that intrinsically encodes the time of detection for optical photons.
Figure 4B:
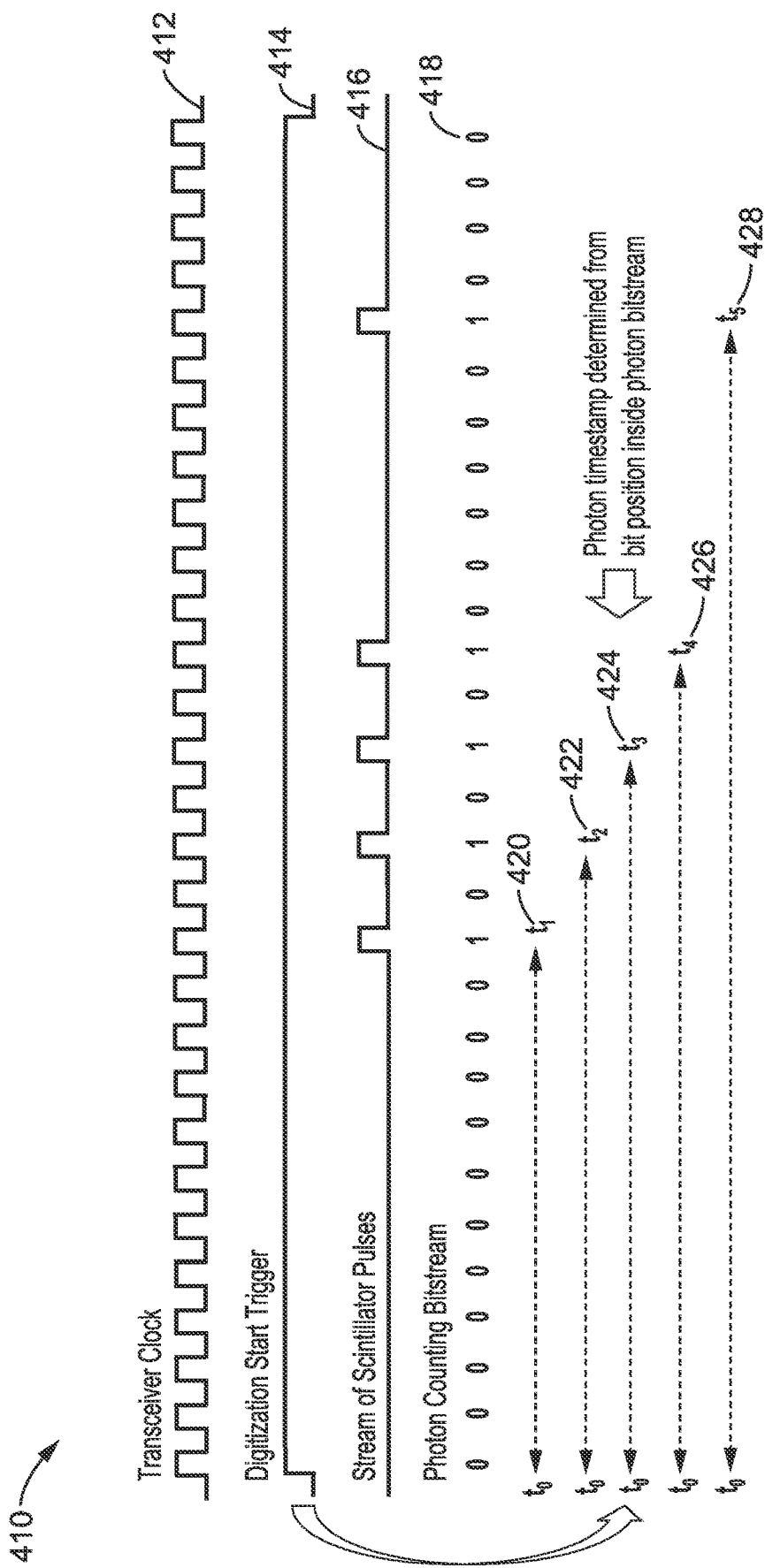
FIG. 4B shows an example of an optical photon data stream being processed by a transceiver in a FPGA.

Refer now to FIG. 4A and FIG. 4B. FIG. 4A is a graph 400 that highlights another unique aspect of the methods for direct digitization and transmission of optical photon data streams that intrinsically encodes the time of detection for optical photons. Here a scintillation photon stream 402 is input into a low-voltage differential signaling (LVDS) comparator to produce a photon counting bitstream 404 operating between a minimum rail of −0.1 V 406 and a maximum rail of 0.2 V 408.

FIG. 4B shows an example 410 of an optical photon data stream being processed by a transceiver in a FPGA. Since the clock speed 412 of the transceiver is set, the time at which each bit (or detected optical photon) arrives is known intrinsically by the position of the bit, relative to the beginning of the data word that is started by a digitization start trigger 414 to produce a digital photon stream of scintillator pulses 416. The resulting photon counting bitstream 416 results, in this example, with 5 bits being temporally located at $t_1$ 420, $t_2$ 422, $t_3$ 424, $t_4$ 426, and $t_5$ 428.

Basis for Photon Counting PET Detector Concept

The concept outlined above in FIG. 1 and FIG. 2A can be realized when sensor channel density and electronic readouts are appropriately matched with a scintillator's luminosity. In FIG. 2B, the temporal luminescence profile of a lutetium oxyorthosilicate (LYSO) scintillator is plotted, noting that the highest density of photon emission typically occurs within the first nanosecond (ns) of excitation. Thus, engineering a detector capable of managing the luminosity in this early time window, provides the capability for counting each optical photon over the entire scintillation envelope.

In FIG. 2B, the sensor channel density and single photon instrument response width (in FWHM) required to count each photon arriving within the first ns of interaction time (conservative values of 40% LCE and 50% PDE assumed) is plotted. The values for each axis required to accomplish this can be accomplished by using arrays of commercial SiPMs.

Another aspect of the photon counting bitstream concept for signal digitization and data transmission is that the methodology intrinsically provides the ability to record the time of arrival of optical photons. How this is automatically captured in the photon counting bitstream concept is illustrated in FIG. 4A and FIG. 4B. In FIG. 4A, an example photon data stream from the example demonstration of FIG. 3 is shown. As depicted in FIG. 4B, an FPGA's transceiver will be running at known clock rate. Thus, the time of arrival of optical photons will be encoded in the position of each bit within the transmitted data word. Thus, the data processing methodology for the single photon counting detector technology provides a highly tractable method for channel-dense, multi-hit time-to-digital converters (TDCs) for the optical photon data streams produced in the detector.

Conclusion

In some embodiments, the detector is not only producing scintillation photons but also other optical phenomena, such as Cherenkov light, in one example. The methods detailed in this technology are also capable of counting photons from these detection media or mixtures of various detection media that generate optical photons as a result of the interaction of ionizing radiation.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A single photon radiation detector, comprising: a scintillator monolith; and at least one detector channel comprising: a. a photomultiplier in optical communication with the scintillator monolith; b. a front end signal shaper in electronic communication with the photomultiplier; c. wherein an input of a single incident radiation photon interacts with the scintillator monolith, thereby creating one or more scintillation photons; d. wherein the one or more of the scintillation photons impinge upon the photomultiplier, thereby creating a corresponding photomultiplier output signal; e. wherein the photomultiplier output signal is processed by the front end signal shaper to produce a stream of scintillator pulses; f. a comparator that inputs the stream of scintillator pulses to output a photon counting bitstream; and g. a gigabit transceiver that converts the photon counting bitstream into a time-to-digital (TDC) converted digital output.

The apparatus or method or system of any preceding or following implementation, wherein the photomultiplier comprises an analog Silicon PhotoMultiplier (SiPM).

The apparatus or method or system of any preceding or following implementation, wherein the comparator comprises a low-voltage differential signaling (LVDS) device.

The apparatus or method or system of any preceding or following implementation, further comprising: an aggregator; wherein the aggregator consolidates the TDC converted digital outputs of the various channels as inputs to form an aggregated overall detector output.

The apparatus or method or system of any preceding or following implementation, wherein the aggregated overall detector output comprises: the TDC converted digital output of the channel; and a channel number corresponding to the detector channel; whereby the detector channel physical location may be determined by the channel number.

The apparatus or method or system of any preceding or following implementation, wherein the aggregator comprises a Field Programmable Gate Array (FPGA).

The apparatus or method or system of any preceding or following implementation, wherein the aggregator comprises a gigabit transceiver within the FPGA.

The apparatus or method or system of any preceding or following implementation, wherein the gigabit transceiver operates at a speed of 60 giga-samples per second or faster.

The apparatus or method or system of any preceding or following implementation, wherein the comparator comprises a Field Programmable Gate Array (FPGA).

The apparatus or method or system of any preceding or following implementation, wherein the photon counting bitstream has a one-to-one correspondence to an arrival of the scintillation photons upon the channel photomultiplier.

The apparatus or method or system of any preceding or following implementation, further comprising: a bandpass optical filter disposed between the scintillator monolith and the detector channel; wherein spurious Geiger discharges between adjacent photomultipliers are reduced.

The apparatus or method or system of any preceding or following implementation, wherein the scintillator monolith comprises a Cherenkov radiator.

A method of single photon radiation detection, comprising: providing a scintillator monolith; and providing at least one detector channel comprising: a. a photomultiplier in optical communication with the scintillator monolith; b. a front end signal shaper in electronic communication with the photomultiplier; c. wherein an input of a single incident radiation photon interacts with the scintillator monolith, thereby creating one or more scintillation photons; d. wherein the one or more of the scintillation photons impinge upon the photomultiplier, thereby creating a corresponding photomultiplier output signal; processing the photomultiplier output signal by the front end signal shaper to produce a stream of scintillator pulses; inputting the stream of scintillator pulses into a comparator to output a photon counting bitstream; and providing a gigabit transceiver to convert the photon counting bitstream into a time-to-digital (TDC) converted digital output.

The apparatus or method or system of any preceding or following implementation, wherein the photomultiplier comprises an analog Silicon PhotoMultiplier (SiPM).

The apparatus or method or system of any preceding or following implementation, wherein the comparator comprises a low-voltage differential signaling (LVDS) device.

The apparatus or method or system of any preceding or following implementation, further comprising: aggregating the TDC converted digital outputs of the various channels as inputs to form an aggregated overall detector output.

The apparatus or method or system of any preceding or following implementation, wherein the aggregated overall detector output comprises: the TDC converted digital output of the channel; and a channel number corresponding to the detector channel; whereby the detector channel physical location may be determined by the channel number.

The apparatus or method or system of any preceding or following implementation, wherein the aggregating step is performed by a Field Programmable Gate Array (FPGA).

The apparatus or method or system of any preceding or following implementation, wherein the aggregating step is performed by a gigabit transceiver within the FPGA.

The apparatus or method or system of any preceding or following implementation, wherein the gigabit transceiver operates at a speed of 60 giga-samples per second or faster.

The apparatus or method or system of any preceding or following implementation, wherein the comparator comprises a Field Programmable Gate Array (FPGA).

The apparatus or method or system of any preceding or following implementation, wherein the photon counting bitstream has a one-to-one correspondence to an arrival of the scintillation photons upon the channel photomultiplier.

The apparatus or method or system of any preceding or following implementation, further comprising: providing a bandpass optical filter disposed between the scintillator monolith and the detector channel; wherein spurious Geiger discharges between adjacent photomultipliers are reduced.

The apparatus or method or system of any preceding or following implementation, wherein the scintillator monolith comprises a Cherenkov radiator.

The apparatus or method or system of any preceding or following implementation, wherein the aggregator comprises a gigabit transceiver within an FPGA, wherein the gigabit transceiver operates at a speed of 10 giga-samples per second or faster.

The apparatus or method or system of any preceding or following implementation, wherein the aggregating step is performed on an aggregator comprising: a gigabit transceiver within an FPGA; wherein the gigabit transceiver operates at a speed of 10 giga-samples per second or faster.

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A single photon radiation detector, comprising:
   (a) a scintillator monolith; and
   (b) at least one detector channel comprising:
      (i) a photomultiplier in optical communication with the scintillator monolith;
      (ii) a front end signal shaper in electronic communication with the photomultiplier;
      (iii) wherein an input of a single incident radiation photon interacts with the scintillator monolith, thereby creating one or more scintillation photons;
      (iv) wherein the one or more of the scintillation photons impinge upon the photomultiplier, thereby creating a corresponding photomultiplier output signal;
      (v) wherein the photomultiplier output signal is processed by the front end signal shaper to produce a stream of scintillator pulses;
      (vi) a comparator that inputs the stream of scintillator pulses to output a photon counting bitstream; and
      (vii) a gigabit transceiver that converts the photon counting bitstream into a time-to-digital (TDC) converted digital output.

2. The single photon radiation detector of claim 1, wherein the photomultiplier comprises an analog Silicon Photomultiplier (SiPM).

3. The single photon radiation detector of claim 1, wherein the comparator comprises a low-voltage differential signaling (LVDS) device.

4. The single photon radiation detector of claim 1, further comprising:
   an aggregator;
   wherein the aggregator consolidates the TDC converted digital outputs of the various channels as inputs to form an aggregated overall detector output.

5. The single photon radiation detector of claim 4, wherein the aggregated overall detector output comprises:
   the TDC converted digital output of the channel; and
   a channel number corresponding to the detector channel;
   whereby the detector channel physical location may be determined by the channel number.

6. The single photon radiation detector of claim 4, wherein the aggregator comprises a gigabit transceiver within an FPGA, wherein the gigabit transceiver operates at a speed of 10 giga-samples per second or faster.

7. The single photon radiation detector of claim 4, wherein the comparator comprises a Field Programmable Gate Array (FPGA).

8. The single photon radiation detector of claim 1, wherein the photon counting bitstream has a one-to-one correspondence to an arrival of the scintillation photons upon the channel photomultiplier.

9. The single photon radiation detector of claim 1, further comprising:
a bandpass optical filter disposed between the scintillator monolith and the detector channel;
wherein spurious Geiger discharges between adjacent photomultipliers are reduced.

10. The single photon radiation detector of claim 1, wherein the scintillator monolith comprises a Cherenkov radiator.

11. A method of single photon radiation detection, comprising:
(a) providing a scintillator monolith; and
(b) providing at least one detector channel comprising:
 (i) a photomultiplier in optical communication with the scintillator monolith;
 (ii) a front end signal shaper in electronic communication with the photomultiplier;
 (iii) wherein an input of a single incident radiation photon interacts with the scintillator monolith, thereby creating one or more scintillation photons;
 (iv) wherein the one or more of the scintillation photons impinge upon the photomultiplier, thereby creating a corresponding photomultiplier output signal;
(c) processing the photomultiplier output signal by the front end signal shaper to produce a stream of scintillator pulses;
(d) inputting the stream of scintillator pulses into a comparator to output a photon counting bitstream; and
(e) providing a gigabit transceiver to convert the photon counting bitstream into a time-to-digital (TDC) converted digital output.

12. The method of single photon radiation detection of claim 11, wherein the photomultiplier comprises an analog Silicon Photomultiplier (SiPM).

13. The method of single photon radiation detection of claim 11, wherein the comparator comprises a low-voltage differential signaling (LVDS) device.

14. The method of single photon radiation detection of claim 11, further comprising:
aggregating the TDC converted digital outputs of the various channels as inputs to form an aggregated overall detector output.

15. The method of single photon radiation detection of claim 14, wherein the aggregated overall detector output comprises:
the TDC converted digital output of the channel; and
a channel number corresponding to the detector channel;
whereby the detector channel physical location may be determined by the channel number.

16. The method of single photon radiation detection of claim 14, wherein the aggregating step is performed on an aggregator comprising:
a gigabit transceiver within an FPGA;
wherein the gigabit transceiver operates at a speed of 10 giga-samples per second or faster.

17. The method of single photon radiation detection of claim 11, wherein the comparator comprises a Field Programmable Gate Array (FPGA).

18. The method of single photon radiation detection of claim 11, wherein the photon counting bitstream has a one-to-one correspondence to an arrival of the scintillation photons upon the channel photomultiplier.

19. The method of single photon radiation detection of claim 11, further comprising:
providing a bandpass optical filter disposed between the scintillator monolith and the detector channel;
wherein spurious Geiger discharges between adjacent photomultipliers are reduced.

20. The method of single photon radiation detection of claim 11, wherein the scintillator monolith comprises a Cherenkov radiator.

* * * * *